United States Patent
Lembke et al.

(10) Patent No.: US 6,820,482 B2
(45) Date of Patent: Nov. 23, 2004

(54) METHOD AND DEVICE FOR DETERMINING GAS FLOW

(75) Inventors: Manfred Lembke, Gerlingen (DE); Hans Hecht, Korntal-Münchingen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 10/169,630

(22) PCT Filed: Dec. 22, 2000

(86) PCT No.: PCT/DE00/04611

§ 371 (c)(1), (2), (4) Date: Jan. 3, 2003

(87) PCT Pub. No.: WO01/51933

PCT Pub. Date: Jul. 19, 2001

(65) Prior Publication Data

US 2003/0140692 A1 Jul. 31, 2003

(30) Foreign Application Priority Data

Jan. 8, 2000 (DE) ........................ 100 00 496

(51) Int. Cl.$^7$ ................................ G01F 1/68
(52) U.S. Cl. ................ 73/204.26; 73/204.18
(58) Field of Search .............. 73/204.26, 204.18, 73/204.16

(56) References Cited

U.S. PATENT DOCUMENTS

| 5,036,701 A | * | 8/1991 | van der Graaf | 73/204.12 |
| 5,142,907 A | * | 9/1992 | Hinkle | 73/204.12 |
| 5,237,867 A | | 8/1993 | Cook | 73/204.15 |

FOREIGN PATENT DOCUMENTS

DE  196 01 791  7/1997

* cited by examiner

*Primary Examiner*—Harshad Patel
(74) *Attorney, Agent, or Firm*—Kenyon & Kenyon

(57) ABSTRACT

A gas flow determination method and a corresponding gas flow determination device. A sensor device including a diaphragm and a frame enclosing it is provided; a predetermined temperature profile is created on the diaphragm; the gas flow to be determined is directed over the diaphragm in a predetermined direction of flow; the change in the temperature profile caused by the gas flow is detected; and the gas flow is determined on the basis of the change thus detected. The temperature at a third location on the diaphragm upstream from the first location and optionally at a fourth location downstream from the second location is regulated at a value corresponding to the local value of the predetermined temperature profile. In this manner, the effect of soiling on the diaphragm may be minimized effectively.

10 Claims, 3 Drawing Sheets

METHOD AND DEVICE FOR DETERMINING GAS FLOW

FIELD OF THE INVENTION

The present invention relates to a gas flow determination method. The present invention also relates to a corresponding gas flow determination device.

BACKGROUND INFORMATION

Although applicable to any desired gas flows, the present invention and the problems on which it is based are explained here with respect to an air flow meter on board a motor vehicle.

FIG. 2 shows a cross section through a conventional gas flow determination device in the form of such an air flow meter.

This air flow meter includes a sensor device SD including a diaphragm D and a frame FR enclosing it. Sensor device SD is manufactured in one piece with diaphragm D and frame FR enclosing it by silicon micromechanical technology. C denotes a mount in the form of a carrier plate.

In addition, a temperature profile generating device is provided to create a predetermined temperature profile on diaphragm D.

A heating device is used for heating a central region H of diaphragm D to a predetermined temperature to create a trapezoidal temperature profile on diaphragm D which includes a plateau in the central region dropping linearly toward the edge region.

Curve A of the standardized temperature profile shown above that indicates the status of the temperature profile without oncoming flow. Curve B indicates the status of the temperature profile with oncoming flow. The oncoming flow with air thus yields a change in the temperature profile on diaphragm D in the region which drops linearly toward the edge region without oncoming flow. This change originates from the heat transport of the oncoming gas in direction of flow F.

A detection device T1, T2 composed of two temperature sensors in the form of Pt resistors is configured so that it detects the change in temperature dT1 caused by the gas-flow at a first location on diaphragm D upstream from heated central region H and the change in temperature dT2 caused by the gas flow at a second location on diaphragm D downstream from heated central region H.

In addition, a determination device (not shown) is also provided and is configured so that it determines the gas flow on the basis of the difference between the temperature changes thus detected, this difference being given by $\Delta T = dT1 - dT2$.

FIG. 3 shows a schematic diagram of soiling on the conventional gas flow determination device in the form of an air flow meter.

In the case of the air flow meter illustrated in FIG. 2, there are deviations in the characteristic lines due to asymmetrical soiling S1 on diaphragm D. Due to soiling S1 shown here on the oncoming flow side, the temperature is lowered there due to the better thermal bonding at the edge of the diaphragm (lower heat resistance). In addition, there may be altered thermal coupling to the oncoming flow gas in the soiled region.

SUMMARY OF THE INVENTION

The gas flow determination method according to the present invention may provide the advantage that the effect of soiling on the diaphragm may be minimized effectively.

The idea on which the present invention is based is that the temperature at a third location on the diaphragm upstream from the first location and optionally at a fourth location downstream from the second location is regulated at a value corresponding to the local value of the predetermined temperature profile. Regulation at the third location is more important than regulation at the fourth location because greater deviations are to be expected at the third location than at the fourth location.

According to an example embodiment, the central region of the diaphragm is heated to a predetermined temperature to create a trapezoidal temperature profile on the diaphragm which includes a plateau in the central region dropping linearly toward the edge region.

According to another example embodiment, the change in temperature caused by the gas flow is detected at a first location on the diaphragm upstream from the heated central region and at a second location on the diaphragm downstream from the heated central region, and the gas flow is also determined on the basis of the difference between the temperature changes thus detected.

According to another example embodiment, a central region of the diaphragm is heated to a predetermined temperature above the temperature of the gas flow to be detected.

According to another example embodiment, the third and fourth locations are selected so that they are located in the edge region of the diaphragm.

Example embodiments of the present invention are illustrated in the drawings and explained in greater detail in the following description.

DETAILED DESCRIPTION

Figure 1:
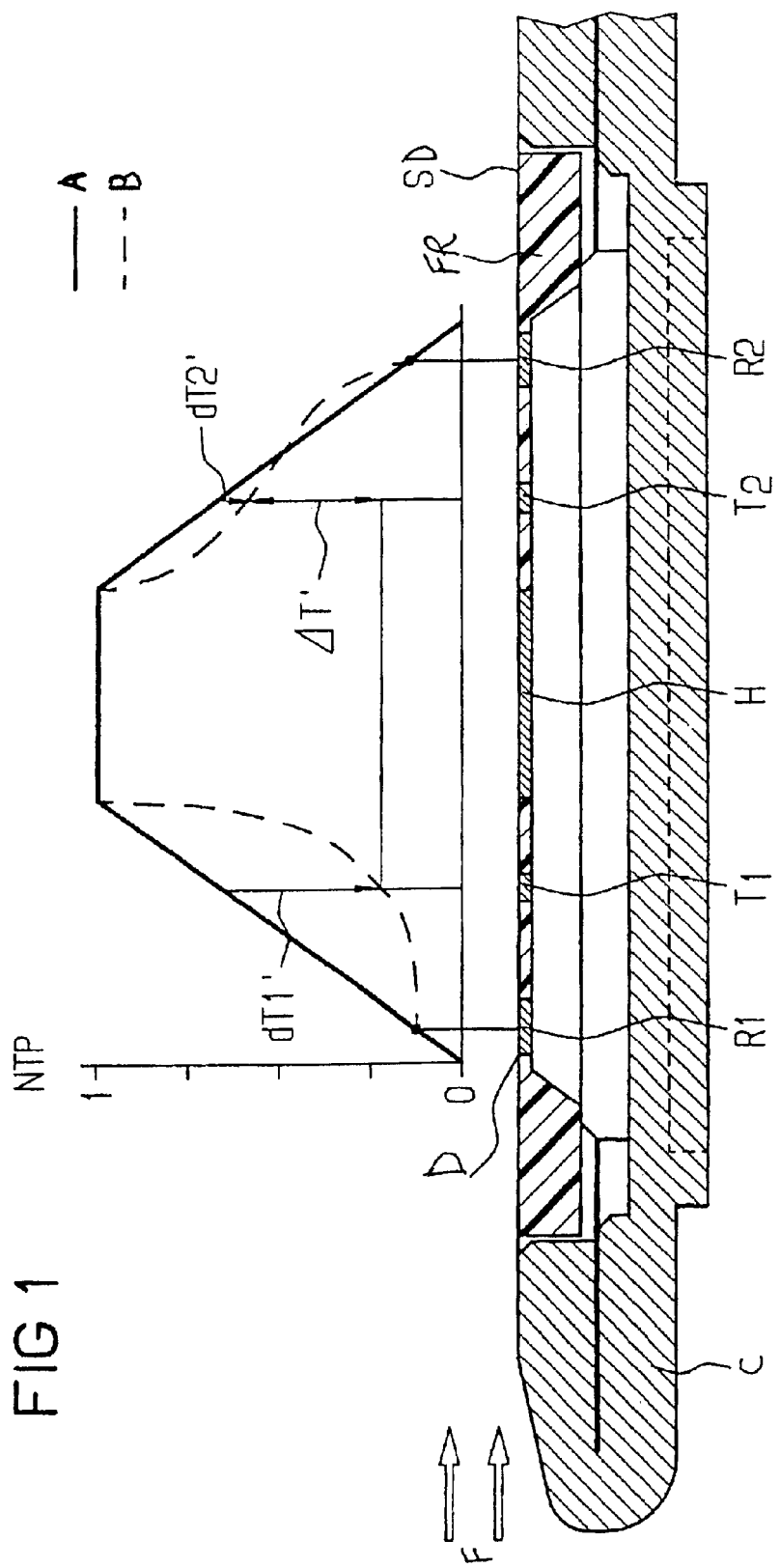
FIG. 1 shows an example embodiment of the gas flow determination device according to the present invention in cross section.

FIG. 1 shows an example embodiment of the gas flow determination device according to the present invention, in the form of an air flow meter in cross section.

Figure 2:
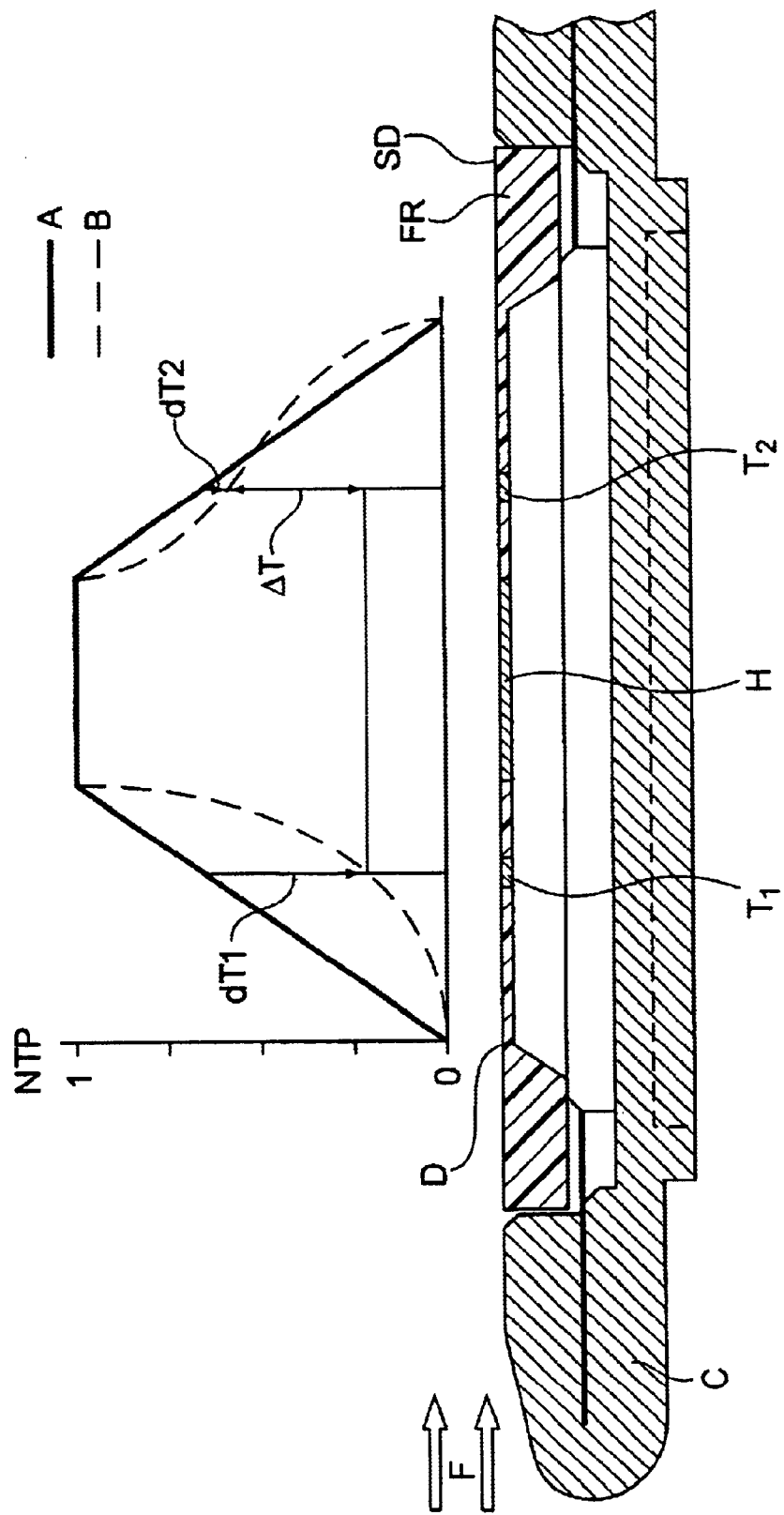
FIG. 2 shows a conventional gas flow determination device in cross section.

This air flow meter is in principle similar in configuration to the conventional air flow meter according to FIG. 2.

It also includes a sensor device SD including a diaphragm D and a frame FR enclosing it, manufactured in one piece by silicon micromechanical technology, and also including a mount in the form of a carrier plate C.

The same heating device is used for heating a central region H of diaphragm D to a predetermined temperature to create a trapezoidal temperature profile on diaphragm D which includes a plateau in the central region dropping linearly toward the edge region.

In addition, a regulating device including two regulators R1, R2 for regulating the temperature on the diaphragm D at a value corresponding to the local value of the predetermined temperature profile is also provided at a third location upstream from the first location and at a fourth location downstream from the second location.

Curve A of the standardized temperature profile shown above that indicates the status of the temperature profile without oncoming flow. Curve B indicates the status of the temperature profile with oncoming flow. The oncoming flow with air thus yields a change in the temperature profile on diaphragm D in the region which drops linearly toward the edge region without any oncoming flow. This change originates from the heat transport of the oncoming gas in direction of flow F.

Detection device T1, T2 composed of two temperature sensors is configured so that it detects the change in temperature dT1' caused by the gas flow at the first location on diaphragm D upstream from heated central region H and the change in temperature dT2' caused by the gas flow at the second location on diaphragm D downstream from heated central region H.

In addition, a determination device (not shown) is also provided and is configured so that it determines the gas flow on the basis of the difference between the temperature changes thus detected, this difference being given by $\Delta T' = dT1' - dT2'$.

The effect of the soiling illustrated in FIG. 2 may be reduced in this example embodiment by regulating device R1, R2 so that it no longer has any mentionable influence on the performance of the characteristic line. It therefore holds that $$\Delta T = dT1 - dT2 \approx \Delta T' = dT1' - dT2'$$

The temperature at which the system is regulated is lower than that in heated central region H but higher than that in frame FR.

Figure 3:
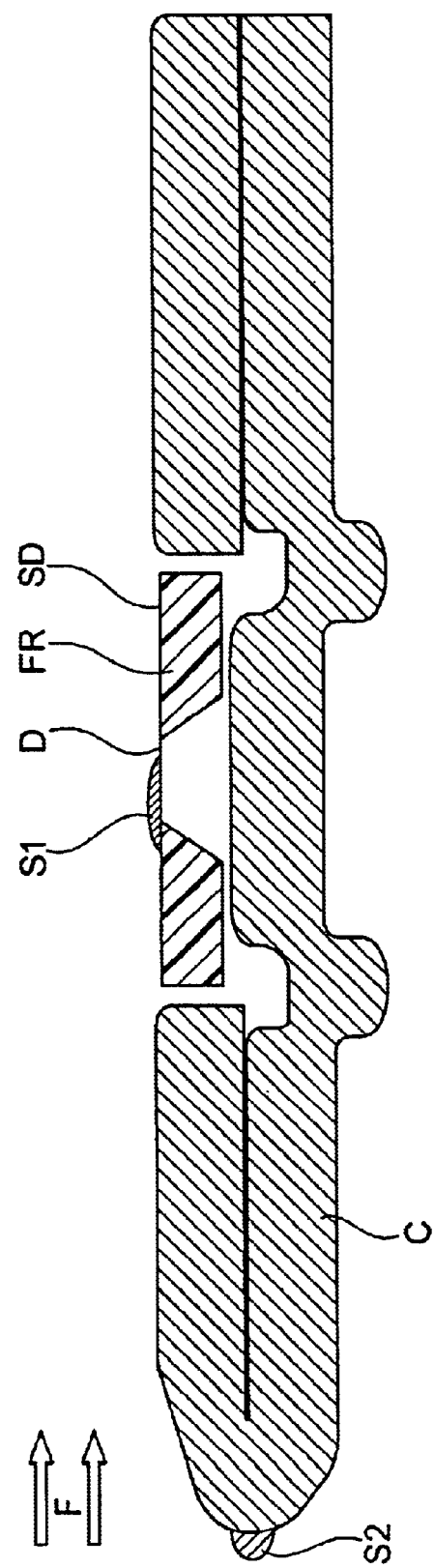
FIG. 3 shows a schematic diagram of soiling on the conventional gas-flow determination device.

If soiling S1 illustrated in FIG. 3 occurs now, for example, the resulting change in thermal conduction toward the edge of the diaphragm no longer results in a reduced temperature difference, because there is a corresponding compensation due to the increased heat output in the temperature regulating region.

Although the present invention has been described above on the basis of an example embodiment, it is not limited to this example embodiment but instead may be modified in a variety of manners.

The present invention is not limited to an air flow meter but instead may be used for any desired gases.

What is claimed is:

1. A method for gas flow determination, comprising:
   providing a sensor device including a diaphragm and a frame enclosing the diaphragm;
   creating a predetermined temperature profile on the diaphragm;
   directing a gas flow to be determined over the diaphragm in a predetermined direction of a flow;
   measuring a change in a temperature profile caused by the gas flow;
   determining the gas flow on the basis of the change in the temperature profile caused by the gas flow; and
   performing one of:
      regulating a temperature at a third location on the diaphragm upstream from a first location to a value corresponding to a local value of the predetermined temperature profile, the first location being located on the diaphragm upstream from a central region of the diaphragm, and
      regulating a temperature at a fourth location downstream from a second location on the diaphragm to the value corresponding to the local value of the predetermined temperature profile, the second location being located on the diaphragm downstream from the central region of the diaphragm.

2. The method according to claim 1, further comprising the step of:
   heating the central region of the diaphragm to a predetermined temperature to create a trapezoidal temperature profile on the diaphragm, the trapezoidal temperature profile having a plateau in the central region dropping linearly toward an edge region.

3. The method according to claim 2, further comprising the step of:
   measuring a change in temperature caused by the gas flow at the first location on the diaphragm upstream from the heated central region and at the second location on the diaphragm downstream from the heated central region.

4. The method according to claim 2, wherein:
   the central region of the diaphragm is heated to a predetermined temperature above a temperature of the gas flow to be determined.

5. The method according to claim 1, wherein the third location and the fourth location are located in an edge region of the diaphragm.

6. A gas flow determination device, comprising:
   a sensor device including a diaphragm and a frame enclosing the diaphragm;
   a temperature profile generating device for creating a predetermined temperature profile on the diaphragm;
   a detection device for measuring a change in a temperature profile caused by a gas flow;
   a determination device for determining the gas flow on the basis of the change in the temperature profile caused by the gas flow; and
   a regulating device for one of:
      regulating a temperature at a third location on the diaphragm upstream from a first location to a value corresponding to a local value of the predetermined temperature profile, the first location being located on the diaphragm upstream from a central region of the diaphragm and
      regulating a temperature at a fourth location downstream from a second location on the diaphragm to the value corresponding to the local value of the predetermined temperature profile, the second location being located on the diaphragm downstream from the central region of the diaphragm.

7. The device according to claim 6, further comprising:
   a heating device for heating the central region of the diaphragm to a predetermined temperature to create a trapezoidal temperature profile on the diaphragm, the trapezoidal temperature profile including a plateau in the central region that drops linearly toward an edge region.

8. The device according to claim 7, wherein:
   the detection device detects a change in temperature caused by the gas flow at the first location on the diaphragm upstream from the heated central region and at the second location on the diaphragm downstream from the heated central region.

9. The device according to claim 6, wherein:
   the third location and the fourth location are located in an edge region of the diaphragm.

10. The device according to claim 6, wherein:
    the sensor device is manufactured in one piece with the diaphragm and the frame using silicon micromechanical technology.

* * * * *